(12) United States Patent
Seidl et al.

(10) Patent No.: US 11,299,923 B2
(45) Date of Patent: Apr. 12, 2022

(54) DRIVE ARRANGEMENT FOR A CLOSURE ELEMENT OF A MOTOR VEHICLE

(71) Applicant: Brose Fahrzeugteile GmbH & Co. Kommanditgesellschaft, Bamberg, Bamberg (DE)

(72) Inventors: Matthias Seidl, Kueps-Schmoelz (DE); Sebastian Schenk, Coburg (DE)

(73) Assignee: Brose Fahrzeugteile GmbH SE & Co. Kommanditgesselschaft, Bamberg, Bamberg (DE)

( * ) Notice: Subject to any disclaimer, the term of this patent is extended or adjusted under 35 U.S.C. 154(b) by 0 days.

(21) Appl. No.: 15/552,980

(22) PCT Filed: Feb. 16, 2016

(86) PCT No.: PCT/EP2016/053253
§ 371 (c)(1),
(2) Date: Aug. 23, 2017

(87) PCT Pub. No.: WO2016/135007
PCT Pub. Date: Sep. 1, 2016

(65) Prior Publication Data
US 2018/0030772 A1  Feb. 1, 2018

(30) Foreign Application Priority Data
Feb. 24, 2015 (DE) .................. 10 2015 102 633

(51) Int. Cl.
*E05F 15/60* (2015.01)
*E05F 15/622* (2015.01)
(Continued)

(52) U.S. Cl.
CPC .............. *E05F 15/60* (2015.01); *B60J 5/101* (2013.01); *E05F 15/622* (2015.01); *H02J 50/05* (2016.02);
(Continued)

(58) Field of Classification Search
CPC ......... E05F 15/60; E05F 15/622; H02J 50/50; H02J 50/10; B60J 5/101; B60R 25/01; E05Y 2400/66; E05Y 2900/546
(Continued)

(56) References Cited

U.S. PATENT DOCUMENTS 1,269,545 A * 6/1918 Name not available ....... 49/340
3,084,927 A * 4/1963 Linder .................... E05F 15/53
49/264
(Continued)

FOREIGN PATENT DOCUMENTS

CN  104158305  11/2014
CN  104201730  12/2014
(Continued)

OTHER PUBLICATIONS

"German Search Report," for Priority Application No. DE 102015102633.3 dated Oct. 5, 2015 (8 pages).
(Continued)

*Primary Examiner* — Muhammad S Islam
*Assistant Examiner* — Devon A Joseph
(74) *Attorney, Agent, or Firm* — Pauly, DeVries Smith & Deffner LLC

(57) ABSTRACT

Various embodiments relate to a drive arrangement for a closure element of a motor vehicle which has an electrical motor vehicle on-board power system, wherein an electric drive for motorized adjustment of the closure element is provided, wherein the drive is assigned a coupling arrangement by which the drive can be actuated electrically. It is proposed that at least one cableless transmission path, in particular to an on-board-power-system-side coupling arrangement, via which the drive can be actuated, can be generated by the drive-side coupling arrangement.

15 Claims, 2 Drawing Sheets

(51) Int. Cl.
*H02J 50/05* (2016.01)
*H02J 50/10* (2016.01)
*B60J 5/10* (2006.01)
*B60R 25/01* (2013.01)

(52) U.S. Cl.
CPC .............. *H02J 50/10* (2016.02); *B60R 25/01* (2013.01); *E05Y 2400/66* (2013.01); *E05Y 2900/546* (2013.01)

(58) Field of Classification Search
USPC .......................................................... 318/3
See application file for complete search history.

(56) References Cited

U.S. PATENT DOCUMENTS

| | | | | |
|---|---|---|---|---|
| 3,500,585 | A * | 3/1970 | Vollmar | E05F 15/616 49/280 |
| 3,908,309 | A * | 9/1975 | Coulter | E05F 3/222 49/31 |
| 4,367,610 | A * | 1/1983 | Goode | E05F 15/53 49/336 |
| 4,658,543 | A * | 4/1987 | Carr | E01F 13/06 49/139 |
| 4,658,545 | A * | 4/1987 | Ingham | E05F 15/63 49/264 |
| 4,713,545 | A * | 12/1987 | Norrgren | G01S 17/04 250/338.1 |
| 4,713,910 | A * | 12/1987 | Quante | E01F 13/046 340/908 |
| 4,727,679 | A * | 3/1988 | Kornbrekke | E05F 15/63 49/138 |
| 4,750,118 | A * | 6/1988 | Heitschel | G05B 19/0425 340/12.5 |
| 5,040,331 | A * | 8/1991 | Merendino | E05F 15/78 49/25 |
| 5,140,316 | A * | 8/1992 | DeLand | B60J 5/06 180/271 |
| 5,212,908 | A * | 5/1993 | Norman | E05B 65/0017 49/139 |
| 5,329,212 | A * | 7/1994 | Feigleson | B65F 1/1638 220/260 |
| 5,469,138 | A * | 11/1995 | Tsai | A62B 3/00 180/271 |
| 5,469,442 | A * | 11/1995 | Seligmann | G08C 23/06 340/870.04 |
| 5,493,812 | A * | 2/1996 | Teich | E05F 15/668 49/26 |
| 5,507,120 | A * | 4/1996 | Current | E05F 3/224 49/139 |
| 5,513,467 | A * | 5/1996 | Current | E05F 1/105 49/139 |
| 5,594,316 | A | 1/1997 | Hayashida | |
| 5,596,840 | A * | 1/1997 | Teich | H04W 52/0254 49/26 |
| 5,625,980 | A * | 5/1997 | Teich | H04W 52/0254 49/26 |
| 5,634,296 | A * | 6/1997 | Hebda | E05F 15/63 49/28 |
| 5,727,348 | A * | 3/1998 | Arnell | G06T 5/20 49/25 |
| 5,770,935 | A * | 6/1998 | Smith | E05F 15/627 318/480 |
| 5,812,391 | A * | 9/1998 | Mehalshick | E06B 9/08 700/9 |
| 5,836,050 | A * | 11/1998 | Rumez | E05F 1/1091 16/84 |
| 5,839,229 | A * | 11/1998 | Briggs | E05F 11/14 49/246 |
| 5,851,050 | A * | 12/1998 | Squire | E05F 15/49 296/146.4 |
| 5,878,530 | A * | 3/1999 | Eccleston | E05F 15/77 49/139 |
| 5,913,763 | A * | 6/1999 | Beran | E05F 15/70 49/506 |
| 5,930,954 | A * | 8/1999 | Hebda | E05F 15/63 49/345 |
| 5,937,578 | A * | 8/1999 | Dolan | E05F 15/43 49/26 |
| 5,954,264 | A * | 9/1999 | Keller | A47G 29/1212 232/17 |
| 6,002,217 | A * | 12/1999 | Stevens | E05F 15/611 318/9 |
| 6,051,829 | A * | 4/2000 | Full | B66B 13/26 250/221 |
| 6,061,964 | A * | 5/2000 | Arnell | E05F 15/63 49/358 |
| 6,062,368 | A * | 5/2000 | Kamm | E04F 17/10 193/31 A |
| 6,067,753 | A * | 5/2000 | Hebda | E05F 15/63 49/28 |
| 6,310,451 | B1 * | 10/2001 | Fitzgibbon | G05B 19/42 318/266 |
| 6,430,871 | B1 * | 8/2002 | Hebda | E05F 15/63 49/139 |
| 6,478,357 | B2 * | 11/2002 | Zhou | E05B 83/16 296/56 |
| 6,550,839 | B2 * | 4/2003 | Rogers, Jr | B60J 5/105 296/146.8 |
| 6,553,717 | B2 * | 4/2003 | St. John | E05F 15/603 192/69.8 |
| 6,588,153 | B1 * | 7/2003 | Kowalczyk | E05F 15/603 49/280 |
| 6,751,909 | B2 * | 6/2004 | Ranaudo | G05B 19/042 49/334 |
| 6,913,299 | B1 * | 7/2005 | Stendal | E05B 47/0047 292/340 |
| 6,967,587 | B2 * | 11/2005 | Snell | E05F 3/224 340/686.6 |
| 7,005,818 | B2 * | 2/2006 | Jensen | H02H 7/0851 318/280 |
| 7,316,096 | B2 * | 1/2008 | Houser | E05F 15/63 49/139 |
| 7,373,756 | B2 * | 5/2008 | Okulov | E05F 15/41 49/339 |
| 7,388,467 | B2 * | 6/2008 | Fisher | G07C 9/00571 340/5.61 |
| 7,436,325 | B2 * | 10/2008 | Bailey | B60R 11/0264 341/20 |
| 7,688,179 | B2 * | 3/2010 | Kurpinski | G07C 9/00309 340/5.72 |
| 7,847,706 | B1 * | 12/2010 | Ross | G08C 17/02 340/12.52 |
| 7,971,316 | B2 * | 7/2011 | Copeland, II | E05F 3/18 16/79 |
| 8,026,809 | B2 * | 9/2011 | Schafer | H04W 52/0225 340/540 |
| 8,169,169 | B2 * | 5/2012 | Hass | E05F 15/63 318/286 |
| 8,261,491 | B2 * | 9/2012 | Yulkowski | E05F 15/63 49/358 |
| 8,284,022 | B2 * | 10/2012 | Kachouh | G07C 9/00309 340/5.72 |
| 8,390,219 | B2 * | 3/2013 | Houser | E05F 15/63 318/255 |
| 8,405,337 | B2 * | 3/2013 | Gebhart | H02P 6/085 318/445 |
| 8,407,937 | B2 * | 4/2013 | Houser | E05F 15/63 49/139 |
| 8,415,902 | B2 * | 4/2013 | Burris | E05F 3/102 318/3 |
| 8,421,588 | B1 * | 4/2013 | Ross | G08C 17/02 340/5.1 |
| 8,527,101 | B2 * | 9/2013 | Burris | E05F 3/102 700/282 |
| 8,547,046 | B2 * | 10/2013 | Burris | E05F 3/227 318/466 |
| 8,564,235 | B2 * | 10/2013 | Burris | E05F 3/22 318/466 |

(56) References Cited

U.S. PATENT DOCUMENTS

| | | | | |
|---|---|---|---|---|
| 8,601,745 B2* | 12/2013 | Berkley | E05F 11/06 | 49/325 |
| 8,653,982 B2* | 2/2014 | Yulkowski | E06B 7/28 | 340/686.1 |
| 8,773,237 B2* | 7/2014 | Burris | G05B 19/0426 | 340/3.32 |
| 8,779,713 B2* | 7/2014 | Burris | E05F 15/70 | 318/466 |
| 8,800,204 B2* | 8/2014 | Kennedy | E05F 15/627 | 49/138 |
| 8,844,200 B2* | 9/2014 | Yulkowski | E05F 15/63 | 49/358 |
| 9,021,742 B2 | 5/2015 | Mizuma et al. | | |
| 9,080,363 B2* | 7/2015 | Reed | E05F 5/025 | |
| 9,163,446 B2* | 10/2015 | Houser | E05F 15/74 | |
| 9,418,543 B1* | 8/2016 | Ross | G05B 15/02 | |
| 9,725,942 B2* | 8/2017 | Gunreben | E05F 15/70 | |
| 9,812,997 B2* | 11/2017 | Kojima | E05F 15/70 | |
| 9,920,564 B2* | 3/2018 | Ebert | E05F 15/73 | |
| 9,995,076 B1* | 6/2018 | Hoffberg | E05F 3/10 | |
| 10,049,565 B1* | 8/2018 | McWhirter | G08C 17/02 | |
| 10,077,591 B2* | 9/2018 | Hass | E05F 15/60 | |
| 10,184,286 B2* | 1/2019 | Kennedy | E21F 1/12 | |
| 10,378,262 B2* | 8/2019 | Yulkowski | E05F 15/70 | |
| 10,392,849 B2* | 8/2019 | Xiao | E05F 5/025 | |
| 2002/0056233 A1* | 5/2002 | Gohara | B60J 5/06 | 49/360 |
| 2002/0139593 A1* | 10/2002 | Charaudeau | B60L 7/14 | 180/65.245 |
| 2002/0183008 A1* | 12/2002 | Menard | G07C 9/00182 | 455/66.1 |
| 2003/0146644 A1* | 8/2003 | Sakai | E05F 15/619 | 296/146.8 |
| 2005/0168010 A1* | 8/2005 | Cleland | E05F 15/41 | 296/146.8 |
| 2006/0151231 A1* | 7/2006 | Bucksch | E05F 15/63 | 180/337 |
| 2007/0257510 A1* | 11/2007 | Kachouh | E05F 15/611 | 296/155 |
| 2009/0093913 A1* | 4/2009 | Copeland, II | E05F 1/002 | 700/282 |
| 2009/0222174 A1* | 9/2009 | Frommer | E05F 15/77 | 701/49 |
| 2011/0271595 A1* | 11/2011 | Eggeling | E05F 15/622 | 49/358 |
| 2011/0291489 A1* | 12/2011 | Tsai | H02J 50/80 | 307/104 |
| 2012/0290177 A1* | 11/2012 | Wagenhuber | E05F 15/77 | 701/49 |
| 2013/0024076 A1* | 1/2013 | Fukui | E05F 15/622 | 701/49 |
| 2014/0000166 A1* | 1/2014 | Groewe | E05F 15/611 | 49/31 |
| 2014/0165469 A1* | 6/2014 | Weingaertner | E05F 15/622 | 49/13 |
| 2014/0195073 A1* | 7/2014 | Herthan | B60R 25/2045 | 701/2 |
| 2014/0324273 A1* | 10/2014 | Russ | B60Q 5/005 | 701/29.1 |
| 2014/0366450 A1* | 12/2014 | Mizuma | H02J 50/12 | 49/349 |
| 2015/0019020 A1* | 1/2015 | Hille | G05B 15/02 | 700/275 |
| 2015/0040698 A1* | 2/2015 | Kessler | E05F 15/60 | 74/89 |
| 2015/0059250 A1* | 3/2015 | Miu | E05F 15/614 | 49/349 |
| 2015/0137941 A1* | 5/2015 | Bauer | G07C 9/00182 | 340/5.61 |
| 2015/0207437 A1* | 7/2015 | Nagler | E05F 15/60 | 318/139 |
| 2015/0222168 A1* | 8/2015 | Sakai | H02K 49/06 | 310/93 |
| 2015/0222169 A1* | 8/2015 | Sakai | H02K 49/106 | 310/93 |
| 2015/0302984 A1* | 10/2015 | Kurs | H01F 38/14 | 307/104 |
| 2015/0345205 A1* | 12/2015 | Gunreben | E05F 15/73 | 701/2 |
| 2016/0230440 A1* | 8/2016 | Takayama | E05F 17/00 | |
| 2016/0329751 A1* | 11/2016 | Mach | H02J 50/60 | |
| 2017/0335615 A1* | 11/2017 | Herrmann | E05F 15/40 | |
| 2017/0335617 A1* | 11/2017 | Herrmann | E05F 15/616 | |
| 2018/0054090 A1* | 2/2018 | Von Novak, III | H02J 50/12 | |
| 2018/0109145 A1* | 4/2018 | Von Novak, III | H02J 7/00034 | |
| 2018/0291666 A1* | 10/2018 | Linden | E05B 81/76 | |
| 2018/0313117 A1* | 11/2018 | Whitham | E05B 81/76 | |
| 2018/0345910 A1* | 12/2018 | Papanikolaou | B08B 7/02 | |
| 2019/0128041 A1* | 5/2019 | Haberberger | E05F 15/627 | |

FOREIGN PATENT DOCUMENTS

| | | |
|---|---|---|
| CN | 104362770 | 2/2015 |
| DE | 19812349 | 9/1998 |
| DE | 102007043372 | 4/2008 |
| DE | 102012013065 | 1/2014 |
| DE | 102015102633 | 8/2016 |
| FR | 2806122 | 9/2001 |
| FR | 2861211 | 4/2005 |
| WO | 20160135007 | 9/2016 |

OTHER PUBLICATIONS

"International Search Report and Written Opinion," for Corresponding PCT Application No. PCT/EP2016/053253 dated May 13, 2016 (10 pages).

First Office Action for Chinese Patent Application No. 201680011955.4 dated Aug. 23, 2018 (4 pages) English Translation.

Search Report for Chinese Patent Application No. 201680011955.4 dated Aug. 2, 2018 (3 pages) English Translation.

* cited by examiner

DRIVE ARRANGEMENT FOR A CLOSURE ELEMENT OF A MOTOR VEHICLE

CROSS-REFERENCE TO RELATED APPLICATIONS

This application is a national stage application under 35 U.S.C. 371 of International Patent Application Serial No. PCT/EP2016/053253, entitled "Drive Arrangement for a Closure Element of a Motor Vehicle," filed Feb. 16, 2016, which claims priority from German Patent Application No. DE 10 2015 102 633.3, filed Feb. 24, 2015, the disclosure of which is incorporated herein by reference.

FIELD OF THE TECHNOLOGY

The disclosure relates to a drive arrangement for a closure element of a motor vehicle and to a motor vehicle on-board power system.

BACKGROUND

The term "closure element" is to be understood in a broad sense here. It comprises, for example, a tailgate, a trunk lid, a hood, a side door, a loading space flap, a window pane, a lifting roof or the like of a motor vehicle. In the text which follows, the emphasis is on the field of application of the motorized adjustment of a tailgate of a motor vehicle.

The motorized adjustment of a tailgate or the like has become widespread in the last few years, in particular in the field of station wagons. For this, the tailgate or the like is assigned a drive arrangement having an electric drive which can be actuated by means of the electric on-board power system of the motor vehicle.

The known drive arrangement (DE 10 2007 043 372 A1) on which the disclosure is based is equipped with an electric drive which serves to perform motorized adjustment of the tailgate or the like. The drive is assigned a cable-based coupling arrangement by means of which the drive can be actuated electrically. In particular, the coupling arrangement provides a cable connection by means of which electrical energy for the energy supply of the drive can be transmitted. The cable connection additionally comprises control lines for transmitting control signals.

Although the actuation of the electric drive by means of a cable-based coupling arrangement provides a high degree of robustness, a precondition for said actuation is precise mechanical mounting in order to comply with planned bending movements of the cable connection during the adjustment of the drive. In the case of deviations, a cable break may occur during the service life of the motor vehicle. Such precision during mounting is also necessary to ensure the necessary leak-proofness of the cable connection to the drive, on the one hand, and to the motor vehicle bodywork, on the other. Correspondingly, in the last few years new tools and fittings for the cable connections, in particular for grommets and plugs there have increasingly been developed. This results in low flexibility of use of the drive arrangement, since the drive arrangement always has to be fitted for a quite specific application case. This situation is exacerbated by the fact that the cable connection always has to be connected to a cable harness which has already been present in the vehicle and which has strictly predefined connecting points. In this respect, the flexibility of use of the known drive arrangement is also correspondingly limited.

SUMMARY

Some embodiments are based on the problem of configuring and developing the known drive arrangement in such a way that the flexibility of use thereof is increased at low cost.

The above problem is solved with a drive arrangement described herein.

The basic concept that the actuation of the drive of the drive arrangement can be carried out at least partially in a cableless fashion is essential. The term "actuation" is to be understood in a broad sense here. It comprises not only energy supply of the drive with electrical energy but also the transmission of control signals for triggering drive actions and for monitoring and maintaining the drive.

In particular it is proposed that at least one cableless transmission path, via which the drive can be actuated in the above sense, can be generated by means of the drive-side coupling arrangement. The cableless transmission path can run between the drive and an on-board-power-system-side coupling arrangement. Basically, the cableless transmission path can, however, also lead to other coupling arrangements as will be explained below.

The proposed solution permits partially or even completely cableless mounting of the drive arrangement. The elimination of the cable connection which is known from the prior art provides an increase in the flexibility of use of the drive, since the mechanical provisions which are necessary for a cable connection are also dispensed with. The fitting which is necessary for actuating the drive is limited to parameterization of the cableless transmission path, which can be implemented by control technology, in particular by means of software.

As a result, the drive can be used in a variety of ways without mechanical adaptation to the respective application having to be carried out. In addition to the reduction in the tooling costs, this results in simplification of the mounting and as a result in a reduction of the cycle times during manufacture. A further advantage which is provided by dispensing with a cable connection is the associated reduction in weight of the drive. Moreover, quite generally a higher level of mechanical robustness is obtained since ingress of water via cable openings into the drive, on the one hand, and into the cable bodywork, on the other, can no longer occur. The same applies with respect to dispensing with cable breaks or the like.

In an embodiment, one and the same transmission path serves for the transmission of energy and for the transmission of control signals. This can be implemented, for example by virtue of the fact that the respective control signals are modulated onto an alternating voltage, wherein the alternating voltage originally serves for the cableless transmission of energy. Such a double use of the transmission path can be implemented with simple hardware.

However, depending on the technical control peripheral conditions it can also be advantageous that two transmission paths can be generated by means of the drive-side coupling arrangement, wherein a first cableless transmission path serves for the transmission of energy and a second cableless transmission path serves for the transmission of control signals. This can be advantageous, in particular, if control signals are to be transmitted with a particularly high information content.

In further embodiments, the cableless transmission path comprises an inductive transmission of energy and/or control signals. Such an inductive transmission is basically known and is based on the transmitter-side generation of a magnetic field which flows through a receiver-side inductor. A transmitter-side change in magnetic field induces an electrical voltage in the receiver-side inductor. On the receiver side electrical energy and/or a control signal can correspondingly be tapped. Basically, there can also be provision here that the inductive transmission of energy is at the same time also the inductive transmission of control signals, with the result that the cableless transmission path is used doubly, as mentioned above. Such an inductive transmission can be readily configured bidirectionally.

Alternatively, there can be provision that a capacitive transmission of energy and/or control signals is implemented. In the case of a capacitive transmission the transmission path between the two coupling arrangements forms the dielectric of a coupling capacitor. Correspondingly, the coupling capacitor has a transmitter-side electrode and a receiver-side electrode. As a result of the fact that the electrical chargers at the electrodes of the coupling capacitor change in the same way in terms of absolute value, both energy and a control signal can be transmitted via the coupling capacitor.

In particular for the case in which the energy transmission takes place separately from the signal transmission, it can be advantageous that the transmission of control signals is implemented by means of electromagnetic waves. The relatively large range and the fact that numerous radio standards already exist for such transmission of signals and are capable of being used including the associated hardware is advantageous here. This includes the "Bluetooth" industry standard and a variant of the wireless LAN (WLAN) which can be applied according to the industrial standard IEEE-802.11.

In various embodiments, there is a drive-side energy store for buffering energy which has previously been transmitted by means of the on-board-power-system-side coupling arrangement. As a result of the fact that as a rule high starting currents are necessary for motorized adjustment of a tailgate or the like of a motor vehicle, the energy store can be embodied as a capacitor, in particular as a double layer capacitor.

The above buffer is advantageous in particular for an embodiment in which, in an alternative, the cableless transmission path can be generated exclusively in at least one predetermined coupling position. This means that outside the coupling position a transmission of energy is not possible. The energy store then serves for bypassing, with the result that the drive is supplied with energy over its entire adjustment path. During the transmission of energy exclusively in a predetermined coupling position it is advantageous that given a suitable configuration the transmission path can be extremely short, which simplifies the design of the coupling arrangement.

According to a further teaching, a motor vehicle on-board power system with a coupling arrangement for generating a cableless transmission path to the coupling arrangement of a drive as proposed is provided. Reference can be made to all the statements relating to the proposed drive, which statements are suitable for explaining the coupling arrangement of the motor vehicle on-board power system.

An embodiment provides a drive arrangement for a closure element of a motor vehicle which has an electrical motor vehicle on-board power system, wherein an electric drive for motorized adjustment of the closure element is provided, wherein the drive is assigned a coupling arrangement by means of which the drive can be actuated electrically, wherein at least one cableless transmission path, in particular to an on-board-power-system-side coupling arrangement, via which the drive can be actuated, can be generated by means of the drive-side coupling arrangement.

In various embodiments, energy for the energy supply of the drive can be transmitted via the cableless transmission path.

In various embodiments, control signals can be transmitted via the cableless transmission path.

In various embodiments, both energy and control signals can be transmitted via one and the same transmission path.

In various embodiments, a first cableless transmission path for transmitting energy and a separate second cableless transmission path for transmitting control signals can be generated by means of the drive-side coupling arrangement.

In various embodiments, a cableless transmission path to a coupling arrangement which is separate from the motor vehicle on-board power system can be generated by means of the drive-side coupling arrangement.

In various embodiments, a cableless transmission path to the coupling arrangement of a further electric drive can be generated by means of the drive-side coupling arrangement.

In various embodiments, the cableless transmission path comprises an inductive energy transmission, and the drive-side coupling arrangement has an inductive energy transmission arrangement which interacts with an inductive energy transmission arrangement of the on-board-power-system-side coupling arrangement.

In various embodiments, the cableless transmission path comprises an inductive control signal transmission, and the drive-side coupling arrangement comprises an inductive control signal transmission arrangement which interacts with an inductive control signal transmission arrangement of the on-board-power-system-side coupling arrangement.

In various embodiments, the cableless transmission path comprises a capacitive energy transmission, and the drive-side coupling arrangement has a capacitive energy transmission arrangement which interacts with a capacitive energy transmission arrangement of the on-board-power-system-side coupling arrangement.

In various embodiments, the cableless transmission path comprises a capacitive control signal transmission, and the drive-side coupling arrangement has a capacitive control signal transmission arrangement which interacts with a capacitive control signal transmission arrangement of the on-board-power-system-side coupling arrangement.

In various embodiments, the cableless transmission path comprises a cableless control signal transmission by means of electromagnetic waves, and the drive-side coupling arrangement has a radio-based control signal transmission arrangement which interacts with a radio-based control signal transmission arrangement of the on-board-power-system-side coupling arrangement, such as wherein the cableless control signal transmission comprises a transmission by means of Bluetooth, WLAN, or the like.

In various embodiments, a drive-side energy store for buffering energy which has been transmitted, in particular, by means of the on-board-power-system-side coupling arrangement is provided, such as wherein the energy store has at least one capacitor, in particular at least one double layer capacitor.

In various embodiments, the cableless transmission path can be generated independently of the position of the closure element, or wherein the cableless transmission path can be generated exclusively in at least one predetermined coupling position of the closure element.

In various embodiments, the drive-side coupling arrangement and the on-board-power-system-side coupling arrangement are arranged on the drive, such as wherein the drive-side coupling arrangement and the on-board-power-system-side coupling arrangement are integrated into a connection joint for the movable mechanical connection of the drive to the motor vehicle bodywork or the closure element.

An embodiment provides a motor vehicle on-board power system having a coupling arrangement for generating a cableless transmission path to the coupling arrangement of a drive as described herein.

BRIEF DESCRIPTION OF THE FIGURES

In the text which follows, various embodiments will be explained in more detail on the basis of a drawing which represents merely one exemplary embodiment. In the drawing.

DETAILED DESCRIPTION

Figure 1:
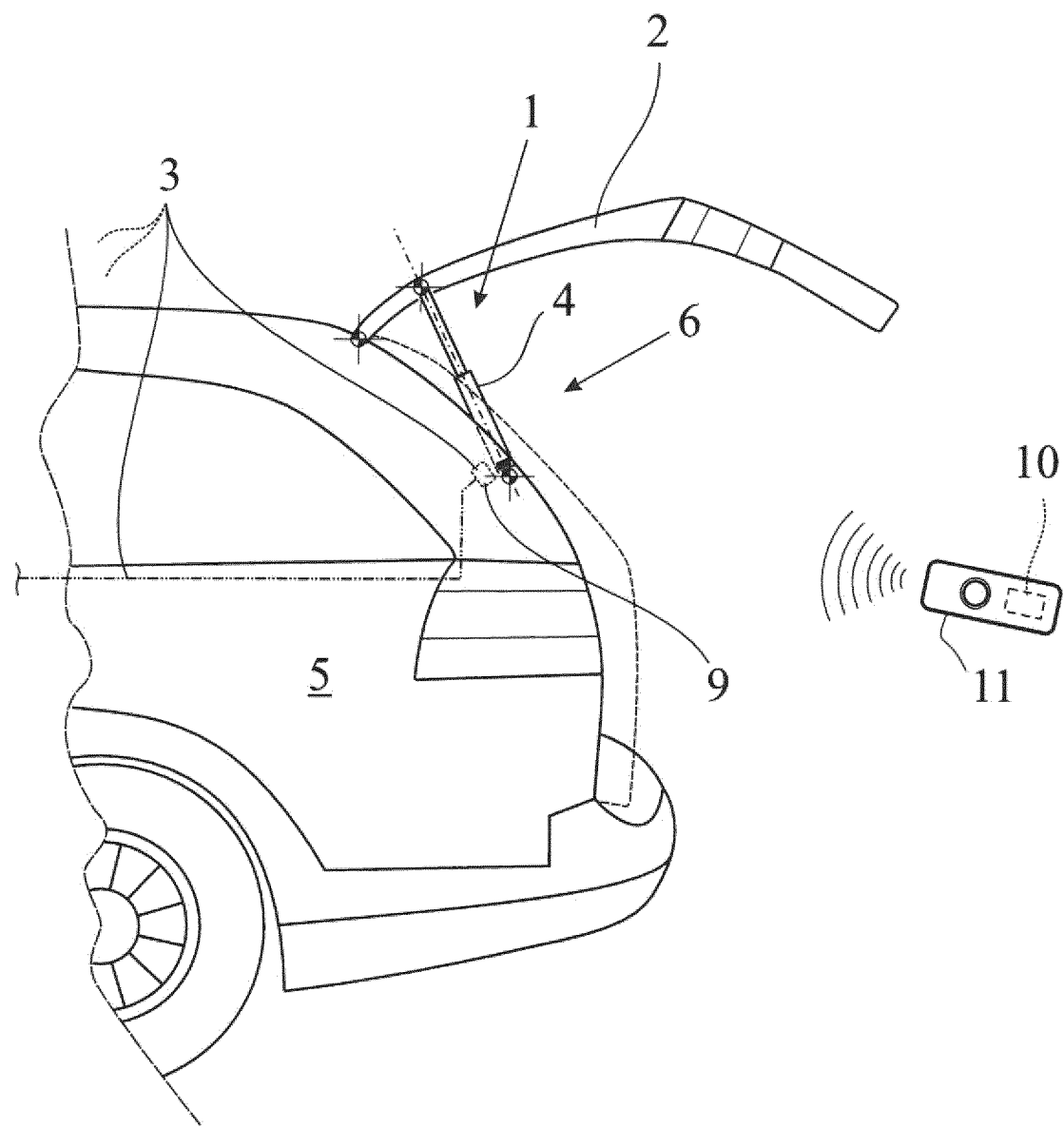
FIG. 1 shows the rear region of a motor vehicle which is equipped with a proposed drive arrangement.

The drive arrangement 1 illustrated in the drawing serves to perform motorized adjustment of a closure element 2 of a motor vehicle. The closure element 2 is in this case a tailgate of the motor vehicle. All the statements relating to the tailgate 2 illustrated in FIG. 1 apply correspondingly to all the other types of closure elements.

The motor vehicle has an electrical motor vehicle on-board power system 3 which, in addition to a motor vehicle battery, comprises a control arrangement and electrical connections for transmitting energy, control signals or the like. The drive arrangement 1 has an electric drive 4 which is coupled in terms of drive technology to the tailgate 2, on the one hand, and to the motor vehicle bodywork 5, on the other. In the exemplary embodiment which is illustrated in FIG. 1, the drive arrangement 1 can have two drives 4, which are each arranged on opposite side edges of the tailgate opening 6. In the text which follows, usually only a single drive 4 is mentioned for the sake of a clear presentation. All the statements in this regard apply correspondingly to a possible further drive 4.

Figure 2:
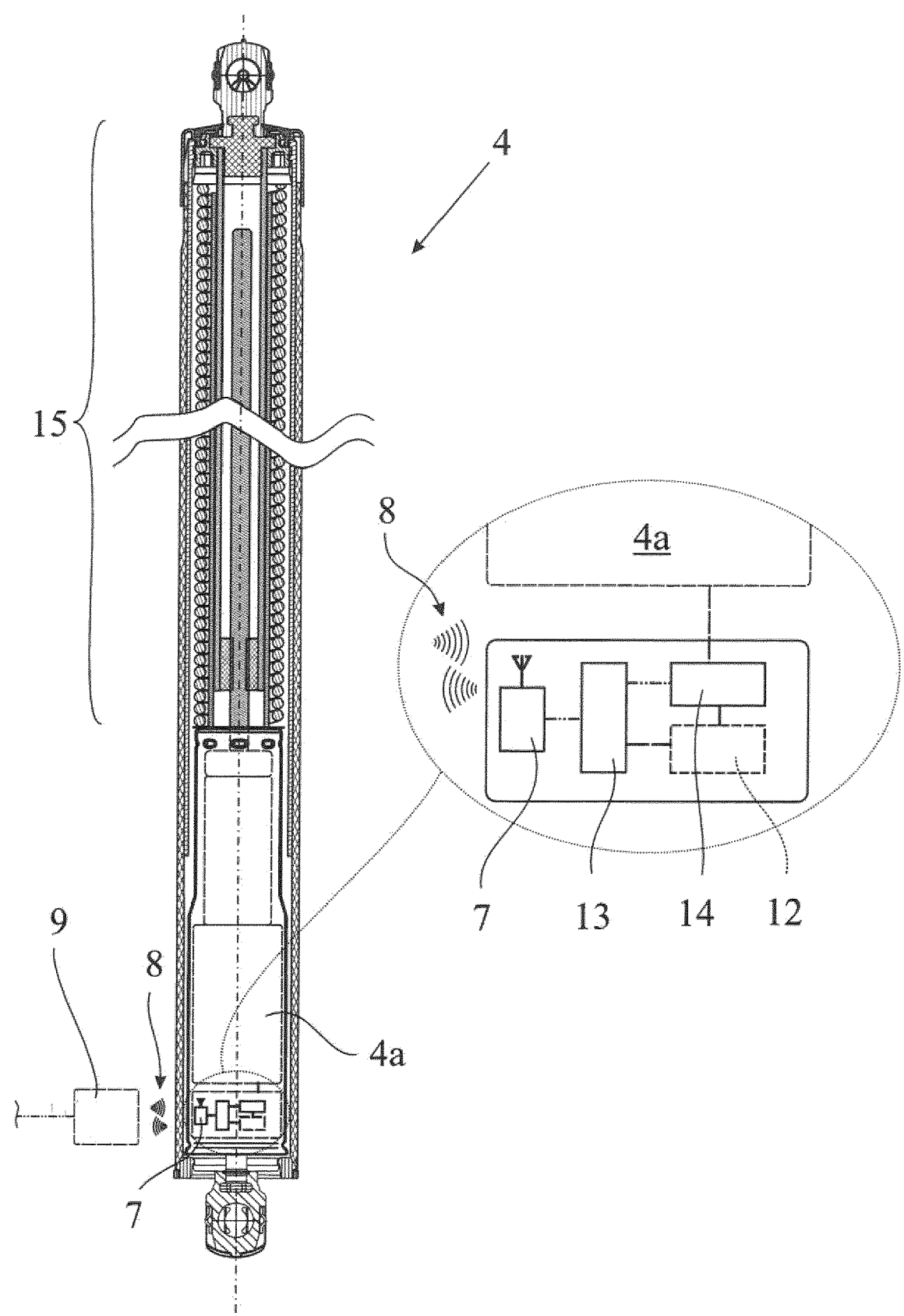
FIG. 2 shows a drive of the drive arrangement according to FIG. 1 in a longitudinal section.

FIG. 2 shows that the drive 4 is assigned a coupling arrangement 7 by means of which the drive 4 can be actuated electrically.

It is essential that at least one cableless transmission path 8, in particular to an on-board-power-system-side coupling arrangement 9, via which the drive 4 can be actuated, can be generated by means of the drive-side coupling arrangement 7. With respect to the broad interpretation of the term "actuation of the drive", reference can be made to the statements in the general part of the description.

FIG. 2 also shows that here the entire actuation of the drive 4 takes place in a cableless fashion, with the result that no cable connection of any type is provided between the drive 4 and the on-board power system 3. This already results in particularly simple mounting of the drive 4, specifically independently of the problems which are described above and which are associated with a cable connection.

As indicated above, there can be provision here that energy for the energy supply of the drive 4 can be transmitted via the cableless transmission path 8. In addition it can be the case that control signals can be transmitted via the cableless transmission path 8. These control signals can be signals which are transferred from the on-board power system to the drive 4 in order to trigger predetermined drive actions such as forward movement, reverse movement, drive stop or the like. The control signals can, however, also be signals which are transmitted from the drive 4 to the on-board power system 3 or the like. Such control signals comprise, for example, sensor signals, status signals or the like. It can be stated that the transmission path 8 can be configured bidirectionally here, at least in so far as the transmission of control signals is concerned. The transmission of energy for the energy supply of the drive 4 is of course provided unidirectionally.

In the illustrated exemplary embodiment it is the case that both energy and control signals can be transmitted via one and the same transmission path 8. However, it is also conceivable that a first cableless transmission path for transmitting energy and a separate second cableless transmission path for transmitting control signals can be generated by means of the drive-side coupling arrangement 7.

It can basically also be advantageous that by means of the drive-side coupling arrangement 7 a cableless transmission path 8 is provided to a coupling arrangement 10 which is separate from the motor vehicle on-board power system 3. Such a coupling arrangement 10 which is separate from the motor vehicle on-board power system 3 is indicated in FIG. 1. This coupling arrangement 10 is a component of a radio key 11. It would be conceivable in this context for the radio key 11 to have a direct cableless technical control connection to the drive 4 in order to actuate the drive 4 correspondingly.

Further, it is conceivable that a cableless transmission path 8 to the coupling arrangement of a further electric drive 4 can be generated by means of the drive-side coupling arrangement 7. In this way, for example cableless synchronization of two drives is conceivable.

One possibility for the proposed transmission by means of the drive-side coupling arrangement 7 is an inductive transmission. The basic method of functioning of an inductive transmission has been explained in the introductory part of the description.

The cableless transmission path 8 can comprise an inductive energy transmission, wherein the drive-side coupling arrangement 7 has an inductive energy transmission arrangement which interacts with an inductive energy transmission arrangement of the on-board-power-system-side coupling arrangement 9.

Alternatively or additionally there can be provision that the cableless transmission path 8 comprises an inductive control signal transmission, and the drive-side coupling arrangement 7 comprises an inductive control signal transmission arrangement which interacts with an inductive control signal transmission arrangement of the on-board-power-system-side coupling arrangement 9.

The above inductive energy transmission arrangement can be at the same time also the above inductive control signal transmission arrangement, with the result that the hardware which is necessary for this can be used doubly.

However, it can basically also be the case that the cableless transmission path is provided capacitively. The basic method of functioning of a capacitive transmission has been explained in the general part of the description.

The cableless transmission path 8 can comprise a capacitive energy transmission, wherein the drive-side coupling arrangement 7 has a capacitive energy transmission arrangement which interacts with a capacitive energy transmission arrangement of the on-board-power-system-side coupling arrangement 9.

Alternatively or additionally there can be provision that the cableless transmission path 8 comprises a capacitive control signal transmission, and the drive-side coupling arrangement 7 has a capacitive control signal transmission arrangement which interacts with a capacitive control signal transmission arrangement of the on-board-power-system-side coupling arrangement 9.

It can basically also be provided here that the capacitive energy transmission arrangement is at the same time the capacitive control signal transmission arrangement, with the result that the hardware for this can be used doubly again.

In particular, for the control signal transmission it is possible to provide a transmission by means of electromagnetic waves. In particular it is proposed for this purpose that the cableless transmission path 8 comprises a cableless control signal transmission by means of electromagnetic waves, and the drive-side coupling arrangement 7 has a radio-based control signal transmission arrangement which interacts with a radio-based control signal transmission arrangement of the on-board-power-system-side coupling arrangement 9. Standards such as Bluetooth, WLAN or the like can be used for the cableless control signal transmission.

In particular for the case in which the cableless transmission path 8 is not available over the entire adjustment range of the drive 4, a drive-side energy store 12 can be provided for buffering energy which has been transmitted, in particular, by means of the on-board-power-system-side coupling arrangement 9. Quite different variants can be used for the embodiment of the energy store 12. Basically it is conceivable that the energy store 12 has an accumulator. However, it can be the case here that the energy store 12 has at least one capacitor. The capacitor can also be configured as a double layer capacitor. A double layer capacitor is an electrochemical energy store. The energy is stored in an electrochemical double layer, which is also referred to as a "Helmholtz layer" ("Lexikon-Aktuelle Fachbegriffe aus Informatik- and Telekommunikation [Dictionary of current specialist terms from computer science and telecommunications]", 9th edition, 2007, VDF Hochschulverlag AG, page 86"). Such a double layer capacitor is also referred to as a "supercapacitor", "supercap", "ultracap" or the like. Of interest in such a double layer capacitor is not only the short charging time but also a high power density at least for a first power output to the drive 4. This ensures that starting of the drive 4 from intermediate positions is also ensured.

There can basically be provision that the cableless transmission path 8 can be generated independently of the position of the closure element 2. However, this makes particular requirements on the coupling arrangement 7, since depending on the configuration comparatively large transmission paths have to be spanned. In contrast, in a particularly simple embodiment it is the case that the cableless transmission path 8 can be generated exclusively in at least one predetermined coupling position. It is particularly advantageous if the transmission path which is to be spanned is particularly short, with the result that the hardware of the coupling arrangement 7 can be of simple design.

For the case in which the cableless transmission path 8 can be generated exclusively in at least one predetermined coupling position, the implementation of an above energy store 12 for buffering energy is particularly advantageous. In the intermediate positions in which the transmission path 8 cannot be generated, the energy store 12 supplies the electrical energy which is necessary to supply the drive 4.

Different technical control structures are conceivable on the drive side. In the exemplary embodiment which is illustrated in FIG. 2, a drive controller 13 is provided which interacts with the coupling arrangement 7. The drive controller 13 acts on a driver module 14 which switches the drive power to the drive motor 4a of the drive 4.

Basically, with the proposed solution it is possible to use all types of drives 4. The drive 4 can be configured here as a spindle drive. A spindle gear 15 is correspondingly connected downstream of the drive motor 4a of the drive 4.

In the illustrated exemplary embodiment only the drive-side coupling arrangement 7 is arranged on the drive 4, while the on-board-power-system-side coupling arrangement 9 is arranged on or in the motor vehicle bodywork 5. As an alternative to this there can be provision that the drive-side coupling arrangement 7 and the on-board-power-system-side coupling arrangement 9 are each arranged on the drive 4. It can then be the case that the drive-side coupling arrangement 7 and the on-board-power-system-side coupling arrangement 9 are integrated into a connection joint for the movable mechanical connection of the drive 4 to the motor vehicle bodywork 5 or the closure element 2. The last-mentioned embodiment is particularly advantageous in terms of mounting technology since the drive 4 and the on-board-power-system-side coupling arrangement 9 do not have to be mounted separately from one another.

According to a further teaching which is assigned independent significance, a motor vehicle on-board power system with a coupling arrangement 9 for generating a cableless transmission path 8 to the coupling arrangement 7 of a drive 4 is provided. Reference can be made to all the statements relating to the proposed drive 4, which statements are suitable for explaining the motor vehicle on-board power system 3.

Finally, reference can be made to the fact that as well as the abovementioned possibilities of transmission by means of inductive transmission, capacitive transmission and transmission using electromagnetic waves, other types of transmission can also be applied. Basically, it is, for example, conceivable for the cableless transmission path 8 to be implemented at least partially by means of an optical transmission.

The invention claimed is:

1. A drive arrangement for a pivoting closure element of a motor vehicle, the drive arrangement comprising: an electrical motor vehicle on-board power system, wherein the motor vehicle on-board power system is assigned an on-board-power-system-side coupling arrangement, the drive arrangement further comprising an electric drive for motorized adjustment of the pivoting closure element coupled by a rotary joint to a motor vehicle bodywork, wherein the drive is assigned a drive-side coupling arrangement which is separate from the on-board-power-system-side coupling arrangement of the motor vehicle on-board power system and by which the drive is configured to be actuated electrically, wherein at least one cableless transmission path between the drive-side coupling arrangement of the drive and the on-board-power-system-side coupling arrangement of the motor vehicle on-board power system, via which the drive is actuated, is generated by the drive-side coupling arrangement of the drive, and wherein the cableless transmission path is generated in multiple angular positions of the pivoting flap, the multiple angular positions comprising substantially an entire movement range of the pivoting flap;

wherein energy for the energy supply of the drive is transmitted via the cableless transmission path, and wherein the cableless transmission path comprises an inductive energy transmission, and the drive-side coupling arrangement has an inductive energy transmission arrangement which interacts with an inductive energy transmission arrangement of the on-board-power-system-side coupling arrangement, or wherein the cableless transmission path comprises a capacitive energy transmission, and the drive-side coupling arrangement has a capacitive energy transmission arrangement which interacts with a capacitive energy transmission arrangement of the on-board-power-system-side coupling arrangement.

2. The drive arrangement as claimed in claim 1, wherein a cableless transmission path to a coupling arrangement which is separate from the motor vehicle on-board power system is generated by the drive-side coupling arrangement.

3. The drive arrangement as claimed in claim 1, wherein a cableless transmission path to the coupling arrangement of a further electric drive is generated by the drive-side coupling arrangement.

4. The drive arrangement as claimed in claim 1, comprising a drive-side energy store for buffering energy which has been transmitted by the on-board-power-system-side coupling arrangement.

5. The drive arrangement as claimed in claim 4, wherein the energy store has at least one capacitor.

6. The drive arrangement as claimed in claim 4, wherein the energy store has at least one double layer capacitor.

7. A drive arrangement for a pivoting closure element of a motor vehicle, the drive arrangement comprising: an electrical motor vehicle on-board power system, wherein the motor vehicle on-board power system is assigned an on-board-power-system-side coupling arrangement, the drive arrangement further comprising an electric drive for motorized adjustment of the pivoting closure element coupled by a rotary joint to a motor vehicle bodywork, wherein the drive is assigned a drive-side coupling arrangement which is separate from the on-board-power-system-side coupling arrangement of the motor vehicle on-board power system and by which the drive is configured to be actuated electrically, wherein at least one cableless transmission path between the drive-side coupling arrangement of the drive and the on-board-power-system-side coupling arrangement of the motor vehicle on-board power system, via which the drive is actuated, is generated by the drive-side coupling arrangement of the drive, wherein the cableless transmission path is generated in multiple angular positions of the pivoting flap, the multiple angular positions comprising substantially an entire movement range of the pivoting flap;

wherein energy for the energy supply of the drive is transmitted via the cableless transmission path;

wherein control signals are transmitted via the cableless transmission path; and wherein the cableless transmission path comprises an inductive control signal transmission, and the drive-side coupling arrangement comprises an inductive control signal transmission arrangement which interacts with an inductive control signal transmission arrangement of the on-board-power-system-side coupling arrangement, or wherein the cableless transmission path comprises a capacitive control signal transmission, and the drive-side coupling arrangement has a capacitive control signal transmission arrangement which interacts with a capacitive control signal transmission arrangement of the on-board-power-system-side coupling arrangement.

8. The drive arrangement as claimed in claim 7, wherein both energy and control signals are transmitted via one and the same transmission path.

9. The drive arrangement as claimed in claim 7, wherein a first cableless transmission path for transmitting energy and a separate second cableless transmission path for transmitting control signals are generated by the drive-side coupling arrangement.

10. The drive arrangement as claimed in claim 7, wherein the cableless transmission path comprises a cableless control signal transmission by electromagnetic waves, and the drive-side coupling arrangement has a radio-based control signal transmission arrangement which interacts with a radio-based control signal transmission arrangement of the on-board-power-system-side coupling arrangement.

11. The drive arrangement as claimed in claim 10, wherein the cableless control signal transmission comprises a transmission by Bluetooth or WLAN.

12. The drive arrangement as claimed in claim 7, wherein the cableless transmission path is generated independently of the position of the pivoting closure element, or wherein the cableless transmission path is generated exclusively in at least one predetermined coupling position of the pivoting closure element.

13. The drive arrangement as claimed in claim 7, wherein the drive-side coupling arrangement and the on-board-power-system-side coupling arrangement are arranged on the drive.

14. The drive arrangement as claimed in claim 13, wherein the drive-side coupling arrangement and the on-board-power-system-side coupling arrangement are integrated into the connection joint for the rotary joint of the drive to the motor vehicle bodywork or the pivoting closure element.

15. A motor vehicle on-board power system having a coupling arrangement for generating a cableless transmission path to the coupling arrangement of a drive as claimed in claim 7.

* * * * *